(12) United States Patent
Lienhart et al.

(10) Patent No.: US 7,050,110 B1
(45) Date of Patent: May 23, 2006

(54) METHOD AND SYSTEM FOR GENERATING ANNOTATIONS VIDEO

(75) Inventors: Rainer Wolfgang Lienhart, Santa Clara, CA (US); Boon-Lock Yeo, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/430,234

(22) Filed: Oct. 29, 1999

(51) Int. Cl.
| | |
|---|---|
| *H04N 7/04* | (2006.01) |
| *H04N 7/08* | (2006.01) |
| *H04N 7/084* | (2006.01) |
| *H04N 7/087* | (2006.01) |
| *H04N 5/14* | (2006.01) |
| *H04N 5/91* | (2006.01) |
| *H04N 9/64* | (2006.01) |

(52) U.S. Cl. .............. 348/474; 348/575; 348/584; 348/589; 386/69; 386/96; 386/98

(58) Field of Classification Search .......... 386/45, 386/68–70, 125–126, 96, 98; 348/575, 474, 348/584, 589; 345/328 BRS; H04N 7/04, H04N 7/08, 7/084, 7/087, 5/14, 5/91, 9/64
See application file for complete search history.

(56) References Cited

U.S. PATENT DOCUMENTS

| | | | |
|---|---|---|---|
| 5,119,474 A | 6/1992 | Beitel et al. | |
| 5,274,758 A | 12/1993 | Beitel et al. | |
| 5,564,005 A | 10/1996 | Weber et al. | |
| 5,600,775 A | 2/1997 | King et al. | |
| 5,613,032 A * | 3/1997 | Cruz et al. ............... | 360/72.1 |
| 5,649,060 A | 7/1997 | Ellozy et al. | |
| 5,675,511 A | 10/1997 | Prasad et al. | |
| 5,703,655 A * | 12/1997 | Corey et al. ............... | 348/468 |
| 5,717,468 A * | 2/1998 | Baryla .................. | 345/636 |
| 5,729,741 A | 3/1998 | Liaguno et al. | |
| 5,767,923 A | 6/1998 | Coleman, Jr. | |
| 5,794,249 A * | 8/1998 | Orsolini et al. .......... | 707/104.1 |
| 5,802,361 A | 9/1998 | Wang et al. | |
| 5,828,809 A * | 10/1998 | Chang et al. ................ | 386/68 |
| 5,859,662 A * | 1/1999 | Cragun et al. ............... | 725/137 |
| 5,920,694 A | 7/1999 | Carleton et al. | |
| 5,923,365 A | 7/1999 | Tamir et al. | |
| 5,949,952 A * | 9/1999 | Bennett et al. ............... | 348/61 |
| 5,953,073 A | 9/1999 | Kozina et al. | |
| 6,085,185 A * | 7/2000 | Matsuzawa et al. ........... | 707/2 |
| 6,154,600 A * | 11/2000 | Newman et al. ............ | 348/552 |
| 6,195,497 B1 * | 2/2001 | Nagasaka et al. ............. | 386/46 |
| 6,226,785 B1 * | 5/2001 | Peterson et al. ........... | 717/106 |
| 6,324,334 B1 * | 11/2001 | Morioka et al. ............. | 386/52 |
| 6,332,147 B1 * | 12/2001 | Moran et al. ............. | 707/500.1 |
| 6,353,461 B1 * | 3/2002 | Shore et al. .............. | 348/722 |
| 6,360,234 B1 * | 3/2002 | Jain et al. ................ | 707/500.1 |
| 6,378,132 B1 * | 4/2002 | Grandin et al. ............ | 348/722 |
| 6,430,357 B1 * | 8/2002 | Orr ........................ | 386/69 |
| 6,608,964 B1 * | 8/2003 | Saito ........................ | 386/52 |
| 6,625,383 B1 * | 9/2003 | Wakimoto et al. ........... | 386/46 |
| 6,636,238 B1 * | 10/2003 | Amir et al. ................ | 345/730 |
| 6,650,827 B1 * | 11/2003 | Ogikubo et al. ............. | 386/70 |

(Continued)

*Primary Examiner*—Brian P. Yenke
(74) *Attorney, Agent, or Firm*—Blakely, Sokoloff, Taylor & Zafman LLP

(57) ABSTRACT

A method and system for processing video signals is disclosed. The system receives a video signal, a first audio signal containing an annotation and a second audio signal containing environmental sounds corresponding to the video signal. In one embodiment the system generates searchable annotations corresponding to the video and second audio signals via the first audio signal.

19 Claims, 5 Drawing Sheets

U.S. PATENT DOCUMENTS

| | | | |
|---|---|---|---|
| 6,686,970 B1 * | 2/2004 | Windle | 348/584 |
| 6,748,158 B1 * | 6/2004 | Jasinschi et al. | 386/69 |
| 6,892,351 B1 * | 5/2005 | Vasudevan et al. | 715/716 |
| 2002/0031331 A1 * | 3/2002 | Kwoh et al. | 386/46 |
| 2002/0097984 A1 * | 7/2002 | Abecassis | 386/70 |
| 2003/0206716 A1 * | 11/2003 | Posa et al. | 386/68 |
| 2004/0170385 A1 * | 9/2004 | Bhadkamkar et al. | 386/68 |
| 2005/0141864 A1 * | 6/2005 | Sezan et al. | 386/69 |

* cited by examiner

METHOD AND SYSTEM FOR GENERATING ANNOTATIONS VIDEO

NOTICE OF COPENDING APPLICATION

U.S. patent application entitled "METHOD AND APPARATUS FOR AUTOMATICALLY ABSTRACTING MULTIMEDIA INFORMATION," application Ser. No. 09/465,988, filed on Sep. 10, 1999, assigned to the assignee of the application herein is referred to below.

FIELD OF THE INVENTION

The present invention relates to the field of video indexing, retrieval and abstraction. More particularly, the present invention relates to a system and method for on-the-fly video annotations for enabling improved video indexing and retrieval.

BACKGROUND OF THE INVENTION

For many years, an increasing number of people own and use video recorders to make video movies that capture their experiences and document their lives. Oddly, most videos are put into a storage box and rarely watched again.

Research is growing in the field of video abstracting. Video abstracting is the processes of taking unedited video footage and combining shorter segments of that footage into one abstract. Existing automatic video abstracting systems concentrate on feature films, documentaries or newscasts. Currently, there are generally three systems that produce videos as abstracts. The first is called video skimming. It aims mainly at abstracting documentaries and newscasts. Video skimming assumes that the audio track transcript is available. The video and the transcript are then aligned by word spotting. The audio track of the video skim is constructed by using language analysis (such as the Term Frequency Inverse Document Frequency measure) to identify important words in the transcript. Audio clips around those words are then cut out. Based on detected faces, text, and camera operations, video clips for the video skim are selected from the surrounding frames.

The second system called MoCA Abstracting. MoCA Abstracting was explicitly designed to generate trailers of feature films. The MoCA Abstracting system performs an extensive video analysis of a feature film to segment it into shots or scenes and to determine special events, such as text appearing in the title sequence, close-up shots of main actors, explosions, gunfire, etc. This information is used to select the clips for the video abstract. During the final assembly, ordering and editing rules are presented. Since MoCA Abstracting relies highly on special events such as explosions, gunfire, shot or reverse shot dialogs, and actions that are usually not present in home videos it cannot be used to abstract home video.

The third system by Saarela and Merialdo does not perform any automatic content analysis. Instead they assume that videos have been annotated manually or automatically by descriptors for various properties and relations of audio and video segments. Based on those descriptors the authors try to define "optimal" summaries. They present constraints for video summaries and methods to evaluate the importance of a specific segment.

These existing automatic video abstracting systems concentrate on feature films, documentaries or newscasts. Since raw video footage such as home video is inherently different from all broadcast video, new abstracting principles and algorithms are needed.

DETAILED DESCRIPTION OF THE PREFERRED EMBODIMENT

Embodiments of the present invention relate to a method and system for generating annotations for video indexing and retrieval. More particularly, in one embodiment the present invention relates to a system and method for on-the-fly video annotations for enabling improved and more selective video abstracts. On-the-fly annotations are verbal notes made by the user contemporaneously with the video footage. Although described with respect to video abstracting, the present invention can be implemented in applications that benefit from indexing and retrieval via annotations. In the following description, for purposes of explanation, specific nomenclature is set forth to provide a thorough understanding of the present invention. For example, the term "video" comprises motion pictures and sound. A "video abstract" denotes a short video consisting of motion pictures and sound. However, it will be apparent to one skilled in the art that these specific details are not required in order to practice the present invention.

The present system allows a user to insert annotations within video footage, use the annotations to create video abstracts and remove the annotations from the original video. The invention may be implemented in multiple embodiments. For example, the video may be annotated "on-the-fly" as described below; alternatively the video may be annotated at a later time. Furthermore, the annotations are not limited to video, but may also be extended to purely audio applications and video obtained by other means. Although the embodiments below implement both hardware components and software components, it will be apparent one skilled in the art that these specific details are not required in order to practice the present invention.

Video Processing System

Figure 1:
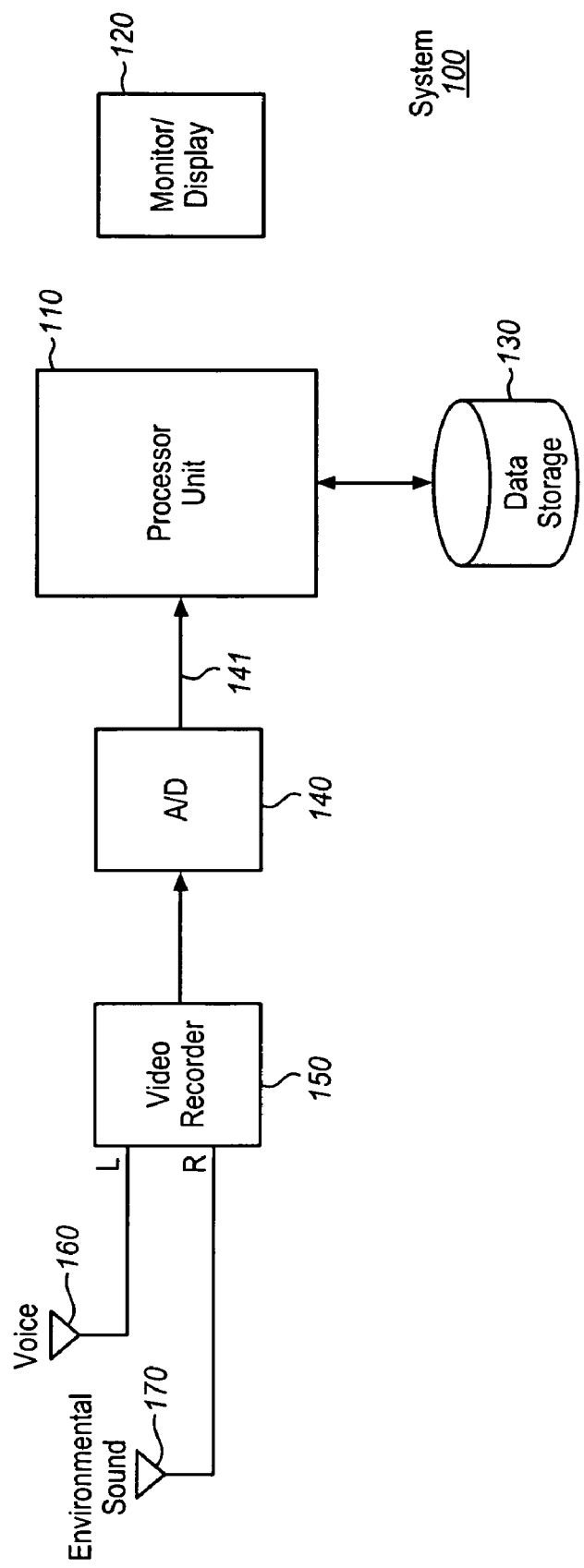
FIG. 1 illustrates a block diagram of an embodiment of a system utilizing the present invention.

Referring to FIG. 1, an illustrative embodiment of a system for generating annotations for video indexing and retrieval is shown. The following discussion of the annotation system is described, as it would be implemented when generating a video abstract, by way of example only. One of ordinary skill in the art could implement further embodiments of the annotation system for other purposes.

In one embodiment, the following system utilizes a two-microphone setup with a video recorder to support annotations on-the-fly. The electronic system (100) comprises a processor unit (110), a display device (120), a data storage unit (130), an analog to digital converter (A/D) (140), a video recorder (150), a voice microphone (160), and an environmental microphone (170).

The processor unit (110) acquires a digital video signal (141) from the video recorder (150) via the A/D (140). Voice microphone (160) provides digitized audio annotations via the A/D (140). Environmental microphone (170) provides digitized environmental audio via A/D (140) containing both environmental sounds as well as annotations. The processor unit (110) takes the digital video signal, analyzes it and stores the video together with the digitized voice and environmental audio signals in the data storage (130). When a user requests a new video abstract, the digitized voice signal, environmental audio signal and digitized video signal (141) are retrieved from the data storage (130) in order to create a new video abstract. The video abstract is played back on the display device (120).

The invention would be equally applicable to a system that utilizes a digital video camera with two digital audio tracks or other digital or analog recording device. Further, the invention could be implemented in a system using less than or more than two microphones.

Still referring to FIG. 1, a video recorder with two microphones is setup to support annotations on-the-fly. The voice microphone (160) may be a unidirectional head worn speech input microphone that captures the voice of the cameraman. The output of the voice microphone (160) is stored as the left audio channel of the video recorder (150), while the output of the environmental microphone is stored as the right audio channel of the video recorder (150). Once the video has been transferred to the processor unit (110), the voice channel is transcribed to computer readable text using a voice to text conversion system. In another embodiment, the audio channels may be switched. The present system can be implemented with existing video recorders, without modification or redesign.

The Processor Unit

Figure 2:
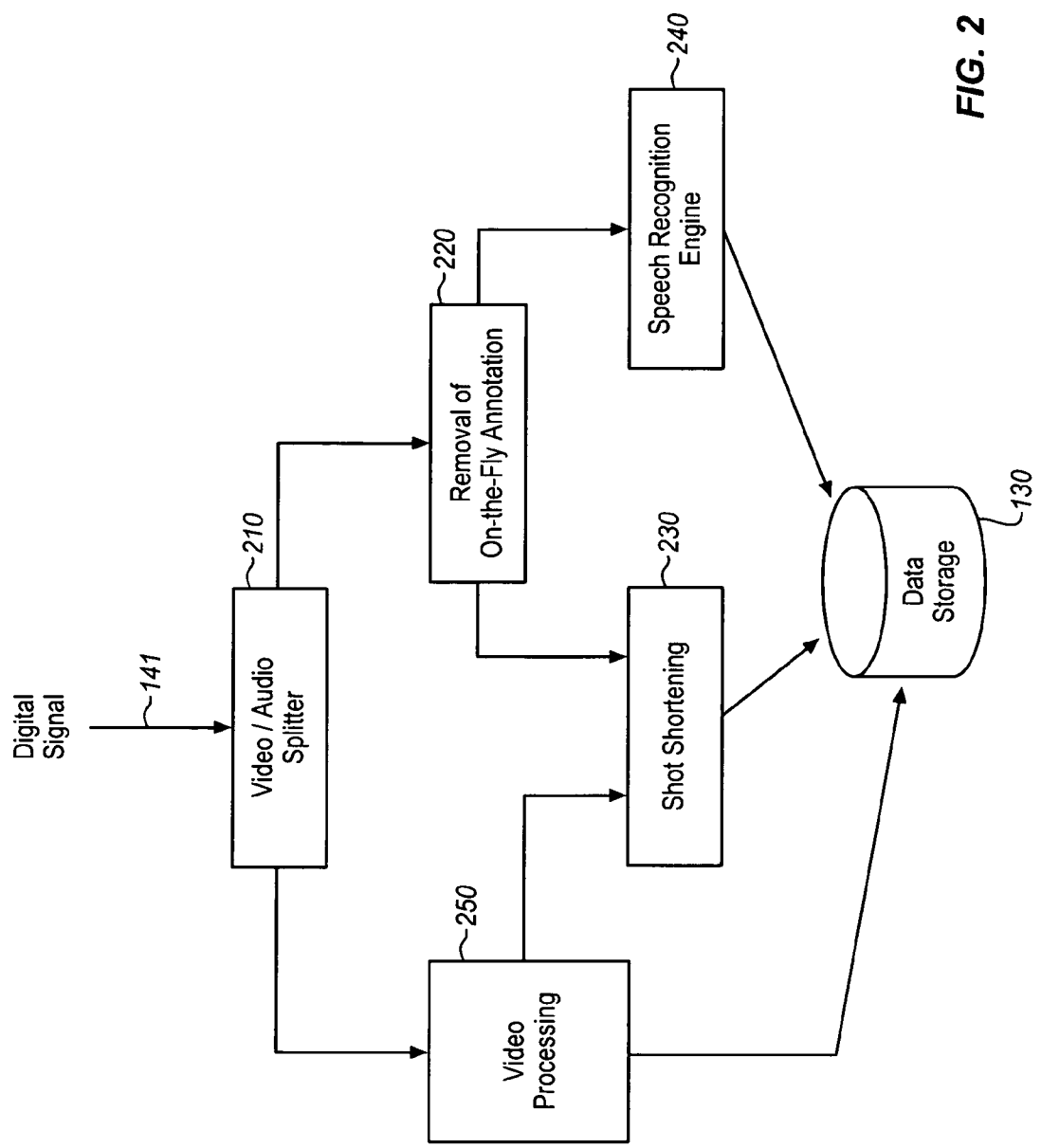
FIG. 2 illustrates a flow diagram of the steps performed in one embodiment of the present invention.

FIG. 2 illustrates a flow diagram of the operations performed by the processor unit (110), according to one embodiment of the present invention. In alternative embodiments, the operations shown in FIG. 2 could be performed by other types of circuitry, such as a DSP, ASIC, or other dedicated circuitry. Moreover, the operations could be a set of instructions stored on a machine readable medium to be executed by the processor unit (110).

At processing block 210 the digital signal (141) is received by a splitter that separates the audio and video channels. At processing block 220 the processor unit (110) removes on-the-fly annotations from the digitized environmental audio. Shot boundaries are generated through video processing block 250 and are used to shorten the duration of each shot. Then, the annotation-free audio signal and shot boundaries are used to find selected clips of video footage. This process is carried out at shot shortening block 230. Next, the description of a shot's representative clips is stored in the data storage (130). In processing block 240, the digitized annotations (161) are passed on to a speech recognition engine. The resulting transcribed annotations as well as time-stamp annotations are stored in data storage (130).

Annotation Transcription

Annotations may be varying types of free speech. However, the system allows each content descriptive free speech annotation to be preceded by a keyword specifying the kind of annotation and its associated temporal validity. In one embodiment, for the processor unit (110) to transcribe annotations with the speech recognition engine (240), the syntax of the annotations is the following: <keyword>, <temporal validity>, and <free speech text> where keyword is a title, person or object and temporal validity is either of a shot, action, event, day or week. The keyword allows general descriptions to be distinguished from specific descriptions (e.g. naming persons and objects). In practice, object descriptions are most often defaulted if no keyword is present. The temporal validity specifies the temporal extent of the description. By way of example, to label a recording as a one-week vacation video, you would say "TITLE WEEK . . . " in order to assign the annotation to the vacation video.

In one embodiment, the names SHOT, ACTION, EVENT, DAY and WEEK denote five types of time-based hierarchical shot clusters. An ACTION or level 1 cluster is defined as a sequence of contiguous actions. Shots within a 5-minute duration, form an ACTION cluster. The idea behind this type of cluster is to group shots of high causality. An EVENT or level 2 cluster represents a sequence of contiguous activities within an one-hour duration. EVENT activities usually last longer than actions and span numerous actions. A DAY or level 3 cluster represents individual days, while a WEEK or level 4 cluster represents seven contiguous DAYs. In one embodiment, if no temporal validity is provided, SHOT or level 0 is assumed. As a result, annotations are not assigned accidentally to unrelated video clips.

Editing commands are also supported through Annotations. The first supported command is DELETE. For the processor unit (110) to DELETE sections of video, the syntax of the annotations is the following: DELETE, <time> and <temporal validity> where time is either CURRENT or LAST. For example, a delete command could be "DELETE CURRENT SHOT," or "DELETE LAST EVENT." Another supported editing command is for RATING. For the processor unit (110) to rate the importance of contents, the syntax of the annotations may be the following: RATING, <time><temporal validity> as <rating> where rating is either SECONDARY, DEFAULT, IMPORTANT or HIGHLIGHT. In other embodiments, alternative editing commands can be supported without departing from the present invention.

Enhancing Video Abstracts

Referring to FIG. 2, which illustrates a flow diagram of the processor unit's (110) functions, annotations enable semantic indexing and retrieval and are useful in diverse applications. Basically, annotations can be exploited in many ways to enhance the video extracts in the video processing block 250. For example, an annotation can be used to select the source video material that is to be abstracted allowing a viewer to watch thematic abstracts. Hereto, the user specifies a text query. All shot clusters whose annotations meet the query are taken as the source video material. For instance, assume that a user wants to view an abstract of all birthday parties of his daughter Nadine. By specifying "Nadine AND birthday" as the query, all clusters containing both words in their associated annotation(s) will be selected as the source video set. An abstract is then created based on the source video set. The user may also specify that the cluster level of clusters retrieved by some query words should be increased for certain query terms with respect to the actual cluster level to which the query term is assigned. For example, if only one shot is annotated "Nadine's birthday," but more than one shot has been recorded, you can request to retrieve the level 2 cluster associated with "Nadine's birthday" which may generate all the shots of the birthday.

Secondly, annotations can be used to enhance the visual presentation of video abstracts. Hereto, short TITLE annotations may be shown as centered text title introducing the subsequent video clips. Annotations might also be added as small scrolling text banners at the bottom or top of the video frames. PEOPLE annotations can be used to append a closing sequence to the video abstract.

Finally, shots can be cut down to the part(s) with descriptive annotations, and annotation-free shots may be discarded. This abstraction rule is motivated by the fact that the important objects, persons, or actions often come along with annotations. Nevertheless, additional clips may either be discarded or added in order to meet the target duration of the requested abstract.

Removing Annotations

Figure 3:
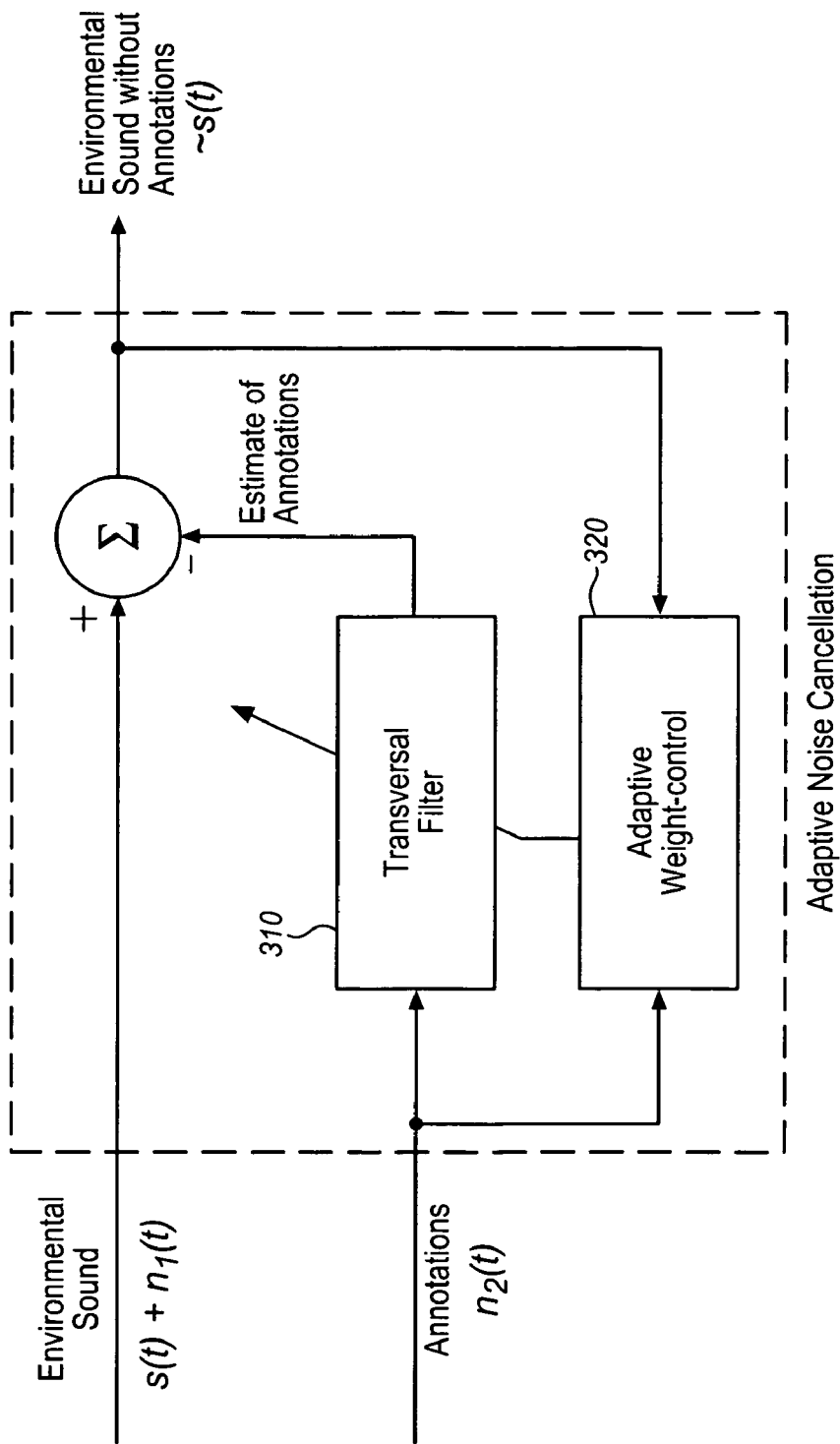
FIG. 3 illustrates a block diagram of adaptive noise cancellation for removing the annotations from the audio signal, according to one embodiment of the present invention.

Referring now to FIG. 3 which illustrates a block diagram of adaptive noise cancellation for removing the annotations from the audio signal in two steps according to one embodiment. In the first step, an annotation detector examines the audio signal in a window of a one second duration and counts the number of amplitude values above a threshold. In alternate embodiments the annotation detector may examine the audio signal in windows less than or greater than a one second duration. If the count exceeds a certain number, the window is declared to contain annotations. Then each annotation window is expanded by half a second to the left and a second to the right in order not to cut off the beginning and ending of the annotation. Overlapping annotation windows are merged into one large annotation's occurrence. The processor unit (110) removes annotations from the environmental audio signal. The least-mean-square (LMS) algorithm developed by Widrow and Hoff may be used to remove the annotations. In other embodiments, annotations may be removed by other methods or algorithms. In LMS filtering a transversal filter (310) estimates the noise signal (e.g. the signal of annotations) in the environmental sound. The difference between the environmental sound and the estimate of annotations is used to calculate the estimation error. Based on the estimation error, the adaptive filter (320) then adjusts the tap weights to reduce the mean-square value of the estimation error.

Figure 4:
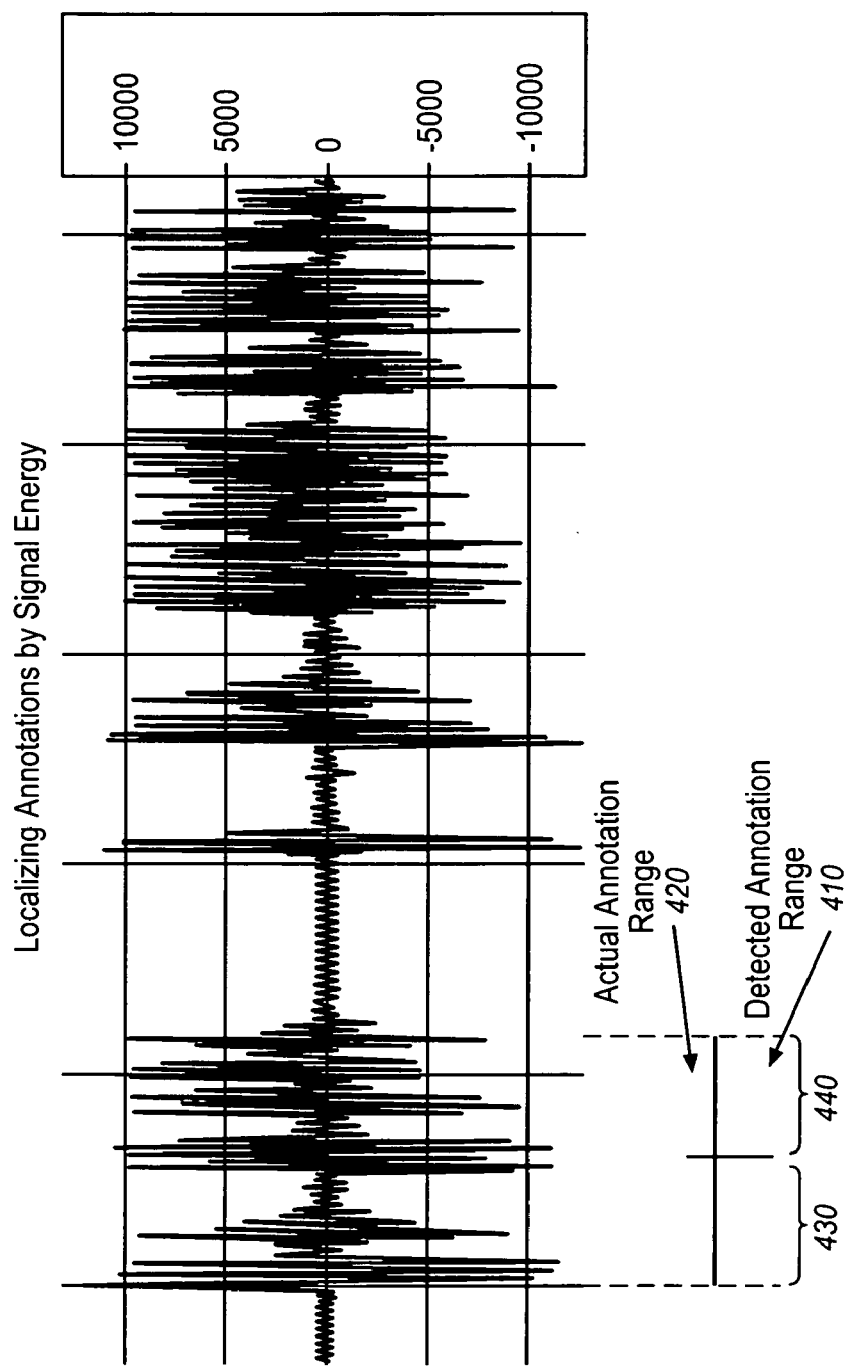
FIG. 4 illustrates the method for localizing annotations by signal energy, according to one embodiment of the present invention.
Figure 5:
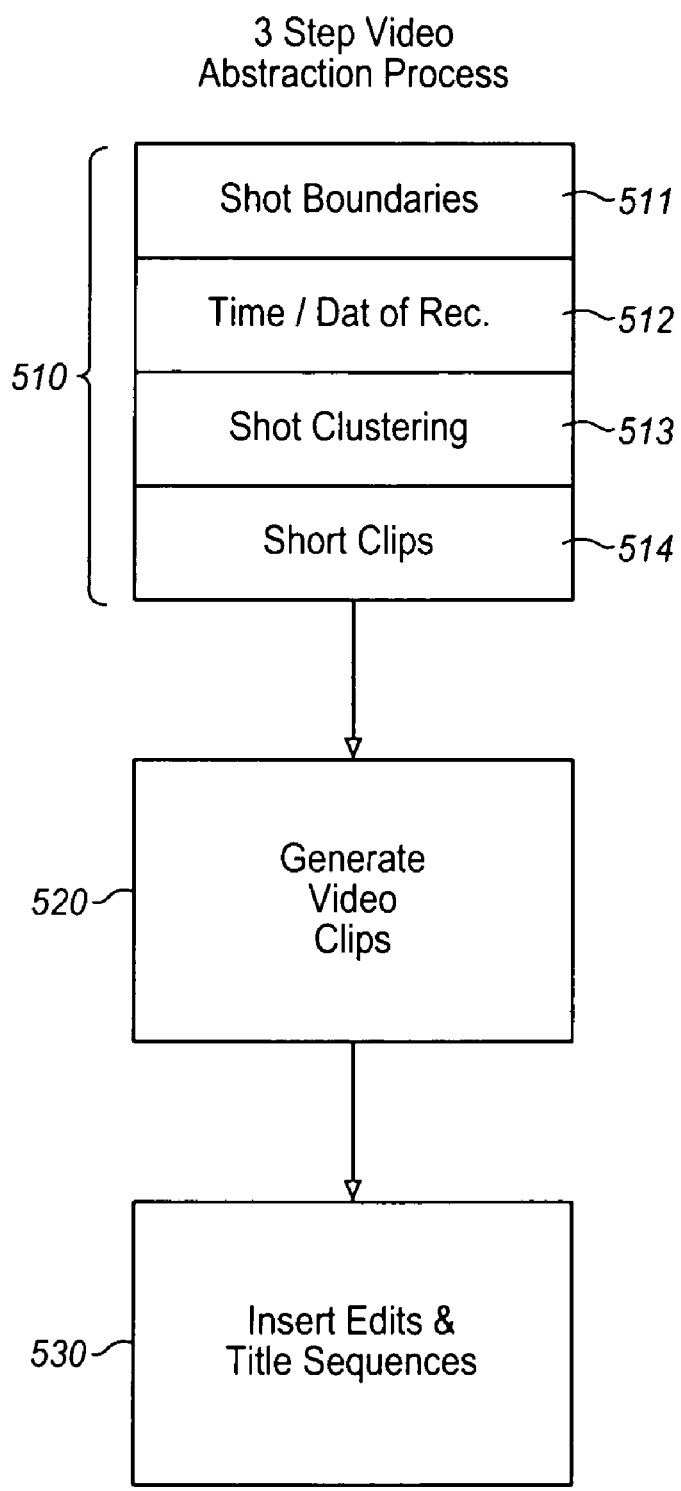
FIG. 5 illustrates a three-step process for generating enhanced video abstracts, according to one embodiment of the present invention.

One potential problem of the LMS algorithm is its slow adjustment rate to the real tap weights of a wide-sense stationary signal as well as to system changes of the underlying signal. Referring to FIG. 4, in order to improve the quality of removal at the beginning of each annotation segment, noise cancellation is not only performed forward in time but also backward over all detected annotation ranges (410). The backward noise cancellation is used to estimate the annotation-free audio signal for the first half of each annotation segment (430). While the forward noise cancellation is used to estimate the annotation-free audio signal for the second half of each annotation segment (440). This scheme improves the beginning of annotation segments.

Creating Video Abstracts

Varying methods for creating video abstracts may be implemented with the present system. By way of example, a video abstract may be obtained from the methods disclosed in co-pending provisional U.S. patent application entitled "METHOD AND APPARATUS FOR AUTOMATICALLY ABSTRACTING MULTIMEDIA INFORMATION." application Ser. No. 09/465,988, filed on Sep. 10, 1999, assigned to the assignee of the application herein.

In one embodiment, video-abstracts are created in 3 steps. First a one-time processing step analyzes the video in order to determine Shot Boundaries (511), Time and Date of Recording (512), Hierarchical Shot Clusters (513), and Short Representative Clips (514).

Shot Boundaries (511) are determined based upon how the video was acquired, whether with a digital video camera or analog video recorder. If a digital video camera is used, the Shot Boundaries (511) are calculated based upon the time and date of the recording stored with the frames. In one embodiment, time increments of more than one second between contiguous frames marks a Shot Boundary (511). With analog video cameras, video is first digitized and Shot Boundaries (511) are then determined.

Time and Date of Recording (512) are also determined based upon how the video was acquired, whether with a digital video camera or analog video recorder. If a digital video camera is used, the Time and Date of Recording (512) can be read on the digital video stream. In the case of an analog video recorder, a superimposed date and time stamp created on the film when the video was acquired can be extracted. By way of example, this information may be extracted from the video by adjusting the text segmentation and text recognition algorithms to the specific characteristics of time and date information in the videos.

Hierarchical Shot Clusters (513) are constructed based upon the Time and Date of Recording (512), thus generating a four-level Hierarchy of Shot Clusters (513). The Shot Clusters (513) are determined by temporal distance between contiguous shots. Individual shots represent a level 0 cluster, while levels 1, 2, 3, and 4 represent a sequence of contiguous actions, activities, individual days and weeks.

In one embodiment, Short Representative Clips (514) for shots are created when a shot is reduced to a relevant part based on audio features. By way of example, the shot may be reduced to approximately 10 seconds of video. Finally, these representative clips that are to be part of the video abstract are selected and compiled into the final video abstract by inserting edits and title sequences (530). Clip selection and edit decisions are based upon heuristic rules. For example, shots of different days are always spliced together by a fade out or fade in sequence making the temporal gap explicitly visible.

The foregoing has described a method and system for creating video abstracts. More particularly, the present invention relates to a system and method for on-the-fly video annotations for enabling improved and more selective video abstracts. It is contemplated that changes and modifications may be made by one of ordinary skill in the art, to the materials and arrangements of elements of the present invention without departing from the scope of the invention.

SUMMARY OF THE INVENTION

The present invention provides a method and system for processing video signals. The system receives a video signal, a first audio signal containing an annotation and a second audio signal containing environmental sounds corresponding to the video signal. In one embodiment the system generates searchable annotations corresponding to the video and second audio signals via the first audio signal.

We claim:

1. A method for processing video comprising:
   receiving a video signal;
   receiving a first audio signal containing annotations, wherein each annotation is preceded by a keyword to specify a type of that annotation;
   receiving a second audio signal containing environmental sounds corresponding to the video signal; and
   converting the annotations into searchable annotations organized as hierarchical shot clusters using a voice-to-text conversion system.

2. The method of claim 1 further comprising removing the annotations from the second audio signal.

3. The method of claim 2 wherein removing the annotation from the second audio signal further comprises utilizing a least-mean-square algorithm.

4. The method of claim 1 further comprising:
   generating a center text title via the searchable annotations; and
   generating a scrolling text banner via the searchable annotations.

5. The method of claim 1 further comprising generating a video abstract via the first and second audio signals, the video signal and the searchable annotations.

6. A system for processing video comprising:
   a display device;
   a video signal displayed on the display device;
   a first audio signal containing annotations, wherein each annotation is preceded by a keyword to specify a type of that annotation;
   a second audio signal containing environmental sounds corresponding to the video signal; and
   a voice-to-text conversion system that converts the annotations into searchable annotations organized as hierarchical shot clusters.

7. The system of claim 6 further comprising a processor to remove the annotations from the second audio signal.

8. The system of claim 7 wherein the processor is further to:
   generate a center text title with the computer searchable annotations; and
   generate a scrolling text banner with the computer searchable annotations.

9. The system of claim 7 wherein the processor is further to generate a video abstract via the first and second audio signals, the video signal and the searchable annotations.

10. The system of claim 6 wherein the video signal is received from a video recorder.

11. The system of claim 6 wherein the first and second audio signals are received from at least one microphone.

12. A machine-readable medium having data stored thereon representing sets of instructions which, when executed by a machine, cause the machine to:
   receive a video signal;
   receive a first audio signal containing annotations, wherein each annotation is preceded by a keyword to specify a type of that annotation;
   receive a second audio signal containing environmental sounds corresponding to the video signal; and
   convert the annotations into searchable annotations organized as hierarchical shot clusters using a voice-to-text conversion system.

13. The machine-readable medium of claim 12 wherein the sets of instructions, when executed by the machine, further cause the machine to remove the annotations from the second audio signal.

14. The machine-readable medium of claim 12 wherein the sets of instructions, when executed by the machine, further cause the machine to:
   generate a center text title via the searchable annotations; and
   generate a scrolling text banner via the searchable annotations.

15. The machine-readable medium of claim 12 wherein the sets of instructions, when executed by the machine, further cause the machine to generate a video abstract via the first and second audio signals, the video signal and the searchable annotations.

16. An apparatus comprising:
   an analog to digital (A/V) converter; and
   a processor coupled to the A/V converter, the processor to receive a video signal,
   receive a first audio signal containing annotations, wherein each annotation is preceded by a keyword to specify a type of that annotation,
   receive a second audio signal containing environmental sounds corresponding to the video signal, and
   convert the annotations into searchable annotations organized as hierarchical shot clusters using a voice-to-text conversion system.

17. The apparatus of claim 16 wherein the processor is further to remove the annotations from the second audio signal.

18. The apparatus of claim 16 wherein the processor is further to:
   generate a center text title with the computer searchable annotations; and
   generate a scrolling text banner with the computer searchable annotations.

19. The apparatus of claim 16 wherein the video signal is received from a video recorder.

* * * * *